(12) United States Patent
Thucanakkenpalayam Sundararajan

(10) Patent No.: US 12,124,379 B2
(45) Date of Patent: Oct. 22, 2024

(54) MANAGEMENT CIRCUITRY FOR A LEAST RECENTLY USED MEMORY MANAGEMENT PROCESS

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 152 days.

(21) Appl. No.: 17/961,473

(22) Filed: Oct. 6, 2022

(65) Prior Publication Data
US 2024/0119007 A1    Apr. 11, 2024

(51) Int. Cl.
*G06F 12/0891*      (2016.01)

(52) U.S. Cl.
CPC .................. *G06F 12/0891* (2013.01)

(58) Field of Classification Search
CPC .................................................. G06F 12/0891
See application file for complete search history.

(56) References Cited

U.S. PATENT DOCUMENTS

2022/0004505 A1*   1/2022   Yang ..................... G06F 12/124
2023/0359556 A1*   11/2023   Kotra .................. G06F 12/0811

OTHER PUBLICATIONS

Sudarshan et al."Highly efficient LRU implementations for high associativity cache memory." Proceedings of 12th IEEE Int. Conf on Advanced Computing and Communications.[retrieved from internet Apr. 26, 2024][<URL:https://scholar.google.com/scholar?hl=en&as_sdt=0%2C47&q=Highly+Efficient+LRU+Implementations>].*

* cited by examiner

*Primary Examiner* — David Yi
*Assistant Examiner* — Nicholas A. Paperno
(74) *Attorney, Agent, or Firm* — Patterson + Sheridan, LLP

(57) ABSTRACT

A processing system employs a method to order the elements within a memory. Ordering the elements includes receiving an accessed memory element. The accessed memory element is requested by a processor from a memory. Further, the accessed memory element is compared to stored elements within the memory to generate control signals. Gate control signals from the control signals are generated. The order of the stored elements within the memory is updated based on the gate control signals.

20 Claims, 5 Drawing Sheets

MANAGEMENT CIRCUITRY FOR A LEAST RECENTLY USED MEMORY MANAGEMENT PROCESS

TECHNICAL FIELD

The present disclosure relates to an energy efficient least recently used process to order elements within a memory.

BACKGROUND

A processing system includes a processor and a corresponding cache memory. The cache memory stores elements from a primary memory accessed by the processor. The response time of the cache memory is less than that of the primary memory. However, the size of the cache memory is less than that of the primary memory. Accordingly, the cache memory stores a limited number of elements as compared to that of the primary. The elements within the cache memory are sorted using a least recently used (LRU) process. As the processor requests elements from the primary memory that are not within the cache memory, the LRU elements within the cache memory are replaced by the newly requested elements. Further, as the processor accesses the elements within the cache memory, the ordering go the elements within the cache memory is updated to reflect which of the memory elements was most recently used.

SUMMARY

In one example, a method includes receiving an accessed memory element. The accessed memory element is requested by a processor from a memory. Further, the method includes comparing, via memory management circuitry, the accessed memory element to stored elements within the memory to generate control signals. The method further includes generating, via gate control circuitry, gate control signals from the control signals, and updating an order of the stored elements within the memory based on the gate control signals.

In one example, a processing system includes a memory, a processor, and memory management circuitry. The memory includes frames comprising stored elements. The processor accesses the stored elements from the memory. The memory management circuitry receives receive an accessed memory element. The accessed memory element is requested by a processor from the memory. The memory management circuitry further compares the accessed memory element to the stored elements within a memory to generate control signals. Further, the memory management circuitry generates gate control signals from the control signals, and outputs the gate control signals to the memory to update an order of the stored elements based on the gate control signals.

In one example, memory management circuitry includes comparator circuitry and gate control circuitry. The comparator circuitry receives receive an accessed memory element. The accessed memory element is requested by a processor from a memory comprising stored elements associated with frames. Further, the comparator circuitry compares the accessed memory element to the stored elements to generate control signals. The gate control circuitry generates gate control signals from the control signals, and outputs the gate control signals to the memory to update an order of the stored elements based on the gate control signals.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
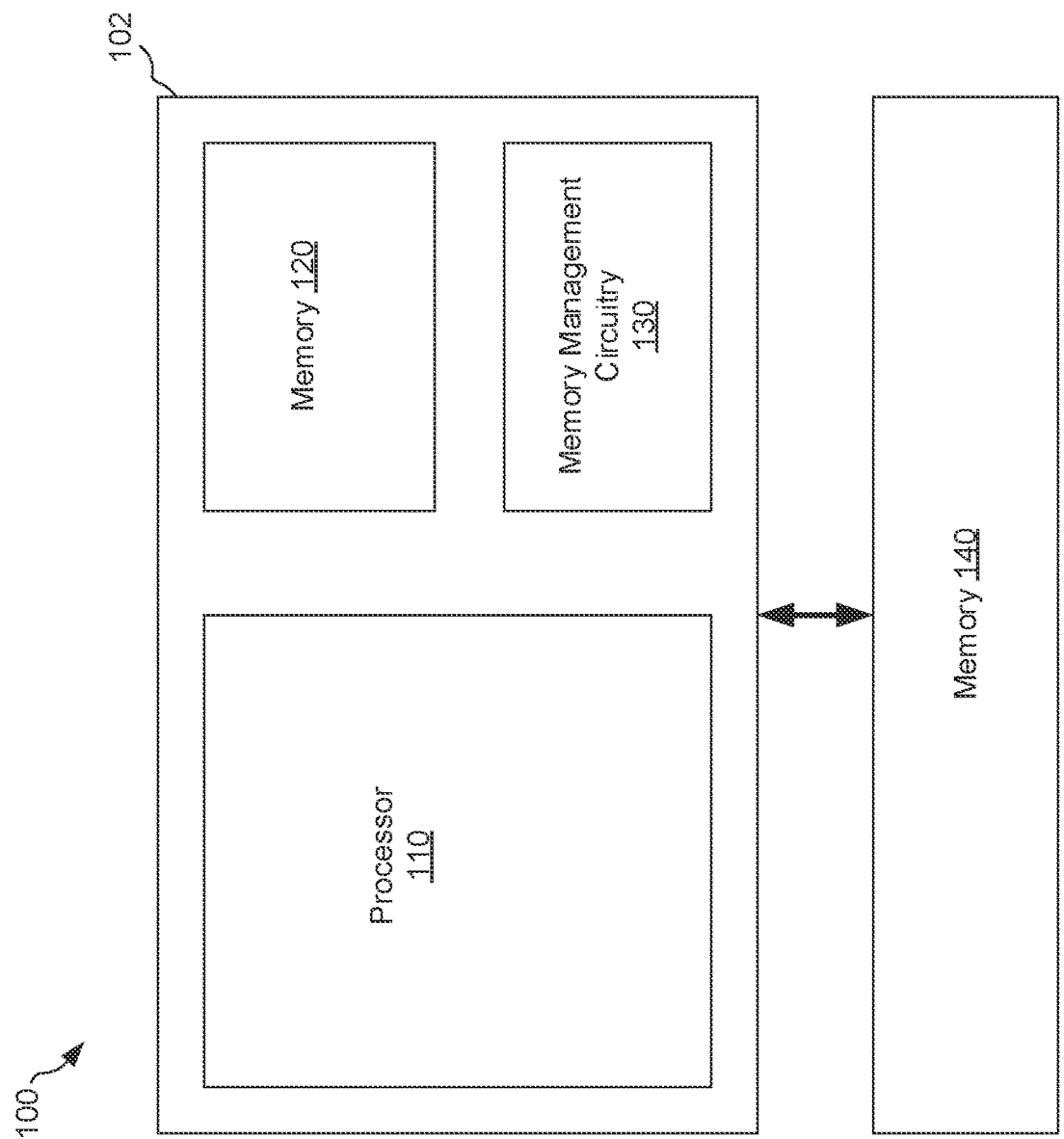
FIG. 1 illustrates a block diagram of a processing system, according one or more examples.

Aspects of the present disclosure relate to an ordering process for a least recently used memory management process.

Processing systems employ a least recently used (LRU) process to sort the elements of a memory from a most recently used (MRU) element to an LRU element. The LRU process can be applied to a second memory (e.g., a cache memory or a memory located locally to the corresponding processor) based on elements accessed by a processor from a primary memory. As the secondary memory is smaller in size than the primary memory, the number of elements (e.g., memory lines or memory blocks) that can be stored by secondary memory is less than that of the primary memory. Elements accessed by the processor are stored within the secondary memory to reduce the response time of those elements as the secondary memory has a reduced response time as compared to that of the primary memory.

The LRU process is used to order (e.g., sort) the elements within the secondary memory, such that as the processor requests access to elements of the primary element not within the secondary memory, the secondary memory can be updated to include the newly accessed elements. As the secondary memory is smaller in size than the primary memory, elements within the secondary memory are removed (e.g., deleted or cleared) to make room for newly accessed elements by the processor. Sorting the elements within the secondary memory using LRU process allows of LRU element, or elements, to be quickly identified and deleted to make room for the newly accessed elements. In one example, the sorting of the elements within the secondary memory is updated to reflect that one of the elements stored within the secondary memory was recently accessed. For example, if the processor request access to an element found within the secondary memory, the elements of the secondary memory are updated to reflect that the newly request element is the MRU element, and the other elements correspondingly. However, current methods for employing an LRU process include comparing the newly accessed element to each entry element within the secondary memory to determine whether or not the newly accessed element is within the secondary memory and/or if the ordering of elements within the secondary memory is to be updated. Accordingly, for a secondary memory having N elements, N comparisons are needed. As the number of elements within the secondary memory increases, the number of comparisons increases, increasing the amount of processing time and power spent updating the order of elements within the secondary memory. The processing time and power spent updating the order of elements within the secondary memory negatively impacts the processing efficiency of the corresponding processing system.

The technical advantages of the present disclosure include, but are not limited to, performing less comparisons between newly accessed element and the elements within a secondary memory than the total number of elements within the secondary memory to improve the efficiency of the corresponding processing system. Further, the processing system of the present disclosure uses gate logic circuitry to control the updating the ordering of the elements within the secondary memory. Accordingly, the efficiency in which the order of elements within a secondary memory is increased, reducing the processing time and power used to update the order of elements within the secondary memory, which improves the processing efficiency of the corresponding processing system.

FIG. 1 illustrates schematic block diagram of a processing system 100, according to one or more examples. The processing system 100 may be configured similar to the computer system 500 of FIG. 5. In one example, the processing system 100 includes processor core 102 and memory 120. In one example, the memory 120 is included within the processor core 102.

The processing system 100 includes one or more integrated circuit (IC) chips. In one example, the processing system 100 includes one or more field programmable gate arrays (FPGAs) and/or application specific ICs (ASICS), among others. In one example, the processing system 100 is a system on chip (SoC).

The processor core 102 includes include a processor 110. In one example, the processor 110 is a central processing unit (CPU). In another example, the processor 110 is a 32-bit or a 64-bit reduced instruction set computer (RISC) processor. In other examples, other types of processors may be used. For example, the processor 110 may be a digital signal processor (DSP). In one or more examples, the processor 110 may be configured similar to the processor device 502 of FIG. 5.

The processor core 102 further includes the memory 120. The memory 120 is a cache memory. For example, the memory 120 is a data cache memory. In one example, the memory 120 is a level one cache (e.g., primary cache or processor cache) memory that is part of the processor 110. In other example, the memory 120 is external from the processor 110, and coupled to the processor 110. In one or more examples, the memory 110 has a size of one or more bytes. In one example, the memory 120 has a size of 16 KB, 32 KB, 64 KB, or more.

The processor core 102 further includes memory management circuitry 130. In one example, the memory management circuitry 130 is included within the memory 120. In another example, the memory management circuitry 130 is external to the memory 120. In such an example, the memory management circuitry 130 may be referred to as a memory management unit of the processor core 102. The memory management circuitry 130 controls storing and sorting elements (e.g., memory lines or memory blocks) of the memory 140 in the memory 120.

The memory 140 is a memory external to the processor core 102. In one example, the memory 140 is shared among multiple processor cores 102. In one example, the memory 140 is larger than the memory 120. The memory 140 is configured similar to that of the main memory 504 of FIG. 5. The memory 140 includes memory lines (e.g., memory blocks) that are accessed by the processor 110 and stored within the memory 120.

In one example, elements (e.g., memory lines or memory blocks) accessed by the processor core 102 from within the memory 140 are stored within the memory 120 as cache lines for easy and quicker access. The memory 120 has faster response times than that of the memory 140. Accordingly, storing recently accessed elements within the memory 120 reduces the amount of time used to respond to memory transactions associated with such elements. However, as the size of the memory 120 is less than that of the memory 140, the number of elements that can be stored within the memory 120 is less than that of the memory 140. In an example where the processor 110 attempts to access an element from the memory 140 that is not in the memory 120, the element is loaded into the memory 120. However, if the memory 120 is full, an element is first removed from the memory 120 before a new element can be added to the memory 120. In such an example, the memory management circuitry 130 sorts the elements within the memory 120 such that the oldest, or LRU, element can be replaced within the newly accessed element. For example, the memory management circuitry 130 uses a LRU process to sort the elements within the memory 120. In such a process, the memory management circuitry 130 sorts the elements from a MRU element to a LRU element.

In one example, the memory management circuitry 130 uses a doubly linked list and a hash map to track the LRU element within the memory 120. In a linked list, the most-recently used element is at the head of the list, and the least recently used element is at the tail of the list. Pointers (head pointers and tail pointers) associated with the elements are used to indicate the order of the elements within the memory 120. A hash map may be used to store the relative age of the elements within the memory 120. In one or more example, the doubly linked list is implemented within a queue, having a maximum size equal to that of the memory 120. In one example, sorting the elements within the queue, sorts the elements from a LRU element to a MRU element. The elements may be stored within frames of the memory 120. The frames may form a queue. Further, the elements are sorted within the frames from a LRU element to a MRU element.

Figure 2:
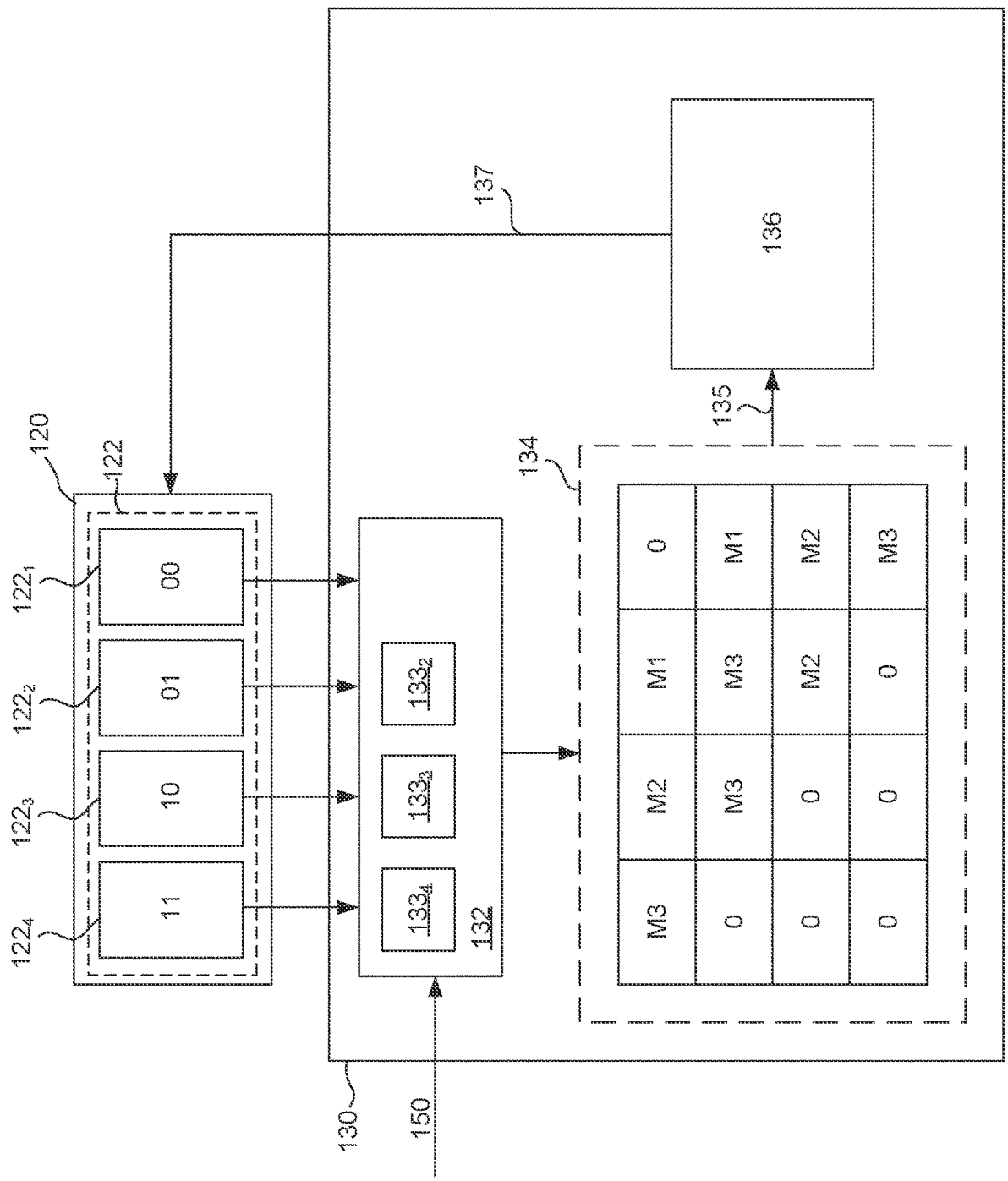
FIG. 2 illustrates a block diagram of memory management circuitry, according one or more examples.

FIG. 2 illustrates an example of the memory management circuitry 130 for ordering the elements within the frames 122 of the memory 120. In one example, the memory management circuitry 130 updates the ordering (e.g., sorts) of the elements within the frames 122 based on the one or more of the elements 00, 01, 10, and 11 within the frames 122 being accessed. The elements 00, 01, 10, and 11 each correspond to a different line (e.g., block or address) of data within the memory 140. As illustrated in FIG. 2, the frame $122_1$ includes element 00, the frame $122_2$ includes element 01, the frame 1223 includes element 10, and the frame $122_4$ includes element 11. The frame $122_1$ is associated with the MRU element and the frame $122_4$ is associated with the LRU element. The frame $122_2$ is associated with an element that has been more recently accessed than the element of frame $122_3$.

In one example, to update the ordering of the elements within the frames 122, a recently accessed element is compared to each element within the frames 122 to determine if the recently accessed element matches any of the elements stored within the frames 122 and if the ordering of the elements is to be updated. For example, FIG. 2 illustrates an initial state elements 00, 01, 10, and 11 within the frames 122, where the frame $122_1$ stores the element that is most recently used and the frame $122_4$ stores the element that is the least recently used. In one example, the element 10 in frame $122_3$ is the newly accessed element by the processor 110. Accordingly, the ordering of the elements with the frames 122 is updated based on the element 10 being the newly accessed element. In one example, to update the ordering of the elements, the element 10 is compared to each of the elements within the frames 122 to determine if the element 10 matches any of the elements. If element 10 does not match the elements, the least recently used element in frame $122_4$ is cleared from the memory 120, and the elements within the frames $122_1$-$122_3$ are shifted to the left, and the newly accessed element 10 is stored in frame $122_1$. If element 10 is determined to match one of the elements within the frames 122, the frames are updated accordingly. For example, the element 10 matches the element 10 within the frame $122_3$. Accordingly, the elements 01 and 00 in frames $122_2$ and $122_1$ are shifted to the left by one frame. The element 11 within frame $122_4$ is not changed, as the element 11 is still the least recently used element. Further, the pointers (e.g., tail and head pointers) between the elements are updated to reflect the updated ordering of the elements with the frames. In such an updating process, the newly accessed element, e.g. element 10, is walked through and compared to each element with in the frames 122 to determine if the newly accessed element matches any of the elements within the frames. However, such a comparison process is processing time and power intensive as a comparison for each element within the memory 120 is used. Such a process reduces the performance of the corresponding processor (e.g., the processor 110).

In one or more examples, to reduce the number of comparison performed when determining whether or not to update the ordering of elements within a memory, the ordering processes as described herein omits a comparison between the IVIRU element and the newly accessed element. In one example, the memory management circuitry 130 includes comparator circuitry 132 and gate control circuitry 136 that are used to update the order of the elements within the frames 122 of the memory 120. Using the m comparator circuitry 132 and the gate control circuitry 136 reduces the processing time and amount of processing power used to update the order of the elements within the frames 122 of the memory 120.

The comparator circuitry 132 includes one or more comparators 133 that compares a newly accessed element with the elements of the frames 122. In one example, the comparator circuitry 132 includes a single comparator 133. In another example, the comparator circuitry 132 includes more than one comparator 133, e.g., a comparator for each of two or more of the frames 122 within the memory 120. In one example, the number of comparators 133 is less than the number of frames 122. For example, the frames 122 of the memory 120 include four frames $122_1$-$122_4$. In such an example, the comparator circuitry 132 includes at least three comparators $133_2$-$133_4$, one for each of the frames $122_2$-$122_4$. In one example, the frame 122 associated with the IVIRU element is not associated with a comparator 133.

In an example where the comparator circuitry 132 includes a single comparator 133, the comparator 133 is used to compare the newly accessed element 150 to the element within each of the frames $122_2$-$122_4$ (e.g., all of the frames except for the frame associated with the IVIRU element) one at a time (e.g., serially) to generate control values. In an example where multiple comparators 133 are used, each of the comparators $133_2$-$133_4$ compare the newly accessed element with the element within the corresponding frame $122_2$-$122_4$ to generate control values.

The comparator circuitry 132 generates control signals 135 that are provided to the gate control circuitry 136 to generate the gate control signals 137. The gate control signals 137 are provided to the memory 120 to indicate which frames 122 are to be updated. In one example, the gate control signals 137 are clock gate enable signals that enable circuitry associated with each of the frames 122 during cycles of a clock signal or signals of the processing system 100 to update the order of elements within the frames 122 of the memory 120.

In an example where the comparator circuitry 132 generates control values (e.g., M1, M2, and M3). In one example, the control values M1, M2, and M3 are captured within a vector. The size of the vector corresponds to a number of frames 122 within the memory 120. In one example, for four frames, a vector is four bit. Each bit of the vector corresponds to a control value. For four control values, a vector may represented as (M3, M2, M1, 0), where M3, M2, and M1, respectively correspond to the outputs of comparators $133_4$, $133_3$, and $133_2$, and the value of 0 corresponds the frame associated with the MRU element (e.g., frame $122_1$). The vector can be rotated to form the matrix 134. The first row of matrix 134 is the vector of M3, M2, M1 and 0, and each subsequent row is the vector rotated to the right by 1, with 0's added to fill in other matrix entries. For example, the last row of the matrix 134 has values of 0, 0, 0, M3, as the vector M3, M2, M1, 0 has been rotated to the right three times. The values of the columns of the matrix 134 indicate the control values that can be used by the gate control circuitry 136 to generate the gate control signals 137. Each frame 122 is associated with a corresponding column within the matrix 134. If any of the values within a column of the matrix 134 is 1, then the corresponding frame 122 is to be updated. For example, the frame $122_4$ corresponds to the column comprising values M3, 0, 0, and 0. If M3 has a value of 1, then the element of the frame $122_4$ is to be updated. The frame $122_3$ corresponds to the column comprising values M2, M3, 0, and 0. If M2 or M1 have a value of 1, then the element of the frame $122_3$ is to be updated. The frame $122_2$ corresponds to the column comprising values M1, M2, M3, and 0. If M1, M2, or M2 have a value of 1, then the element of the frame $122_2$ is to be updated. The frame $122_1$ corresponds to the column comprising values 0, M1, M2, and M3, If M1, M2, or M2 have a value of 1, then the element of the frame $122_1$ is to be updated. As can be seen from the matrix 134, the updating of the frames $122_1$ and $122_2$ is controlled by the same control values.

The matrix 134 of the control values has a size corresponding to the number of frames 122 within the memory 120. For example, for four frames, e.g., frames $122_1$-$122_4$, the matrix is a four by four matrix. In an example where the number of frames is X, the matrix is an X by X matrix. X is one or more. The matrix 134 includes 0 values, M1 values, M2 values, and M3 values. The M1 value corresponds to whether or not the value of the newly accessed element 150 matches the element 01 in frame $122_2$. The M2 value corresponds to whether or not the value of the newly accessed element 150 matches the element 10 in frame $122_3$. The M3 value corresponds to whether or not the value of the newly accessed element 150 matches the element 11 in frame $122_4$. The values M1, M2, and M3 are a value of 0 based on no match between the value of the newly accessed element 150 and the element of the corresponding frame being determined. The values M1, M2, and M3 are a value of 1 based on a match being determined between the value of the newly accessed element 150 and the element of the corresponding frame. The values M1, M2, and M3 are provided as control signals 135 to the gate control circuitry 136 to generate the gate control signals 137.

The control values M1, M2, and M3 are output as control signals 135. For example, the comparator circuitry 132 generates the control signals 135 from the control values M1, M2, and M3, such that each control signal 135 corresponds to a respective one of the control values M1, M3, and M3.

Figure 3:
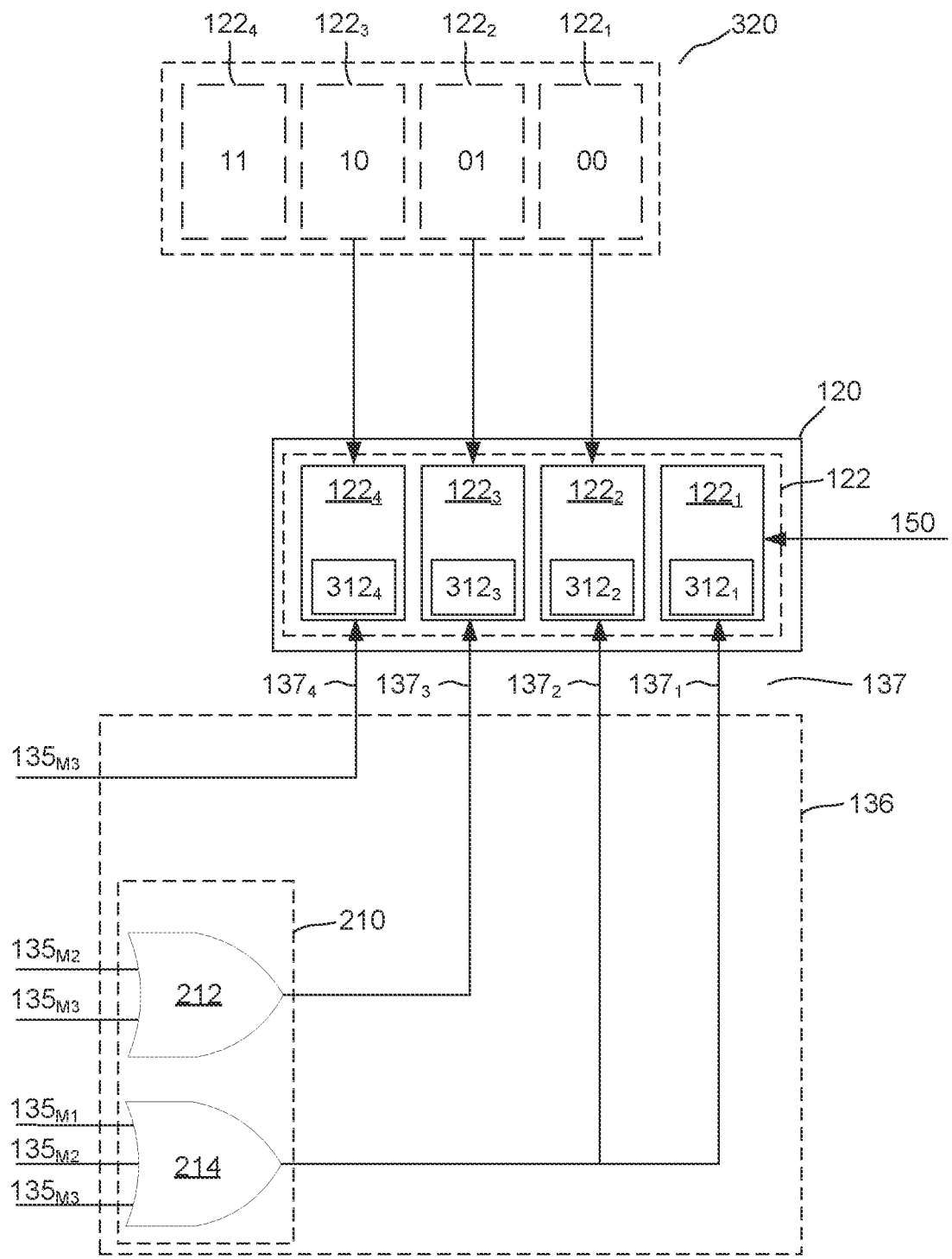
FIG. 3 illustrates a block diagram of gate control signal generation circuitry, according one or more examples.

FIG. 3 illustrates the gate control circuitry 136, according to one or more examples. The gate control circuitry 136 receives the control signals 135 and generates the gate control signals 137 from the control signals 135. In one example, the gate control circuitry 136 outputs the control signal $135_{M3}$ as the gate control signal $137_4$. In such an example, the gate control circuitry 136 functions as a pass-through for the control signal $135_{M3}$. Further, the gate control signal $137_3$ is generated from the control signals $135_{M2}$ and $135_{M3}$. The gate control signals $137_1$ and $137_2$ are generated from the control signals $135_{M1}$, $135_{M2}$ and $135_{M3}$. The combination of control signals 135 used to generate the gate control signals 137 corresponds to the values of the columns of the matrix 134 of FIG. 2.

In one example, each frame 122 includes, or is associated, with respective control circuitry 312 that acts as a gate to control whether or not the frame is updated. In one example, the control circuitry $312_4$ receives the gate control signal $137_4$ and a clock signal (e.g., a clock signal of the processing system 100 of FIG. 1), and updates the element within the frame $122_4$ based on both the gate control signals $137_4$ and the clock signal having a value of 1. The control circuitry $312_3$ receives the gate control signal $137_3$ and the clock signal, and updates the element within the frame $122_3$ based on both the gate control signals $137_3$ and the clock signal having a value of 1. The control circuitry $312_2$ receives the gate control signal $137_2$ and the clock signal, and updates the element within the frame $122_2$ based on both the gate control signals $137_2$ and the clock signal having a value of 1. The control circuitry $312_1$ receives the gate control signal $137_1$ and the clock signal, and updates the element within the frame $122_1$ based on both the gate control signals $137_1$ and the clock signal having a value of 1.

In one example, the gate control circuitry 136 includes gate logic 210. The gate logic 210 includes OR gates 212 and 214. The OR gate 212 receives the controls signals $135_{M2}$ and $135_{M3}$, and based on the values of the control signals $135_{M2}$ and $135_{M3}$, generates the gate control signal $137_3$. The OR gate 212 receives the control signals $135_{M1}$, $135_{M2}$, and $135_{M3}$, and based on the values of the control signals $135_{M1}$, $135_{M2}$, and $135_{M3}$, generates the gate control signals $137_1$ and $137_2$. Accordingly, the gate control signals $137_1$ and $137_2$ have the same value, and, in one or more examples, may be referred to as the same signal.

In one example, the number of OR gates within the gate logic 210 increases as the number of frames 122 increases, and the size of the matrix 134 increases. In one example, the number of OR gates is less than the number of frames 122. I one example, the number of OR gates is two less than the number of frames 122. In other examples, other relationships between the number of OR gates and the number of frames 122 is possible. In one example, the OR gate associated with the LRU frame receives T control signals. T is one less than the total number of frames. Further, while FIG. 3 is described with regard to using OR gates within the gate logic 210, in other examples, other logic gates may be used to form the gate logic 210.

The control signal $135_{M3}$ has a value corresponding to M3 of FIG. 2, the control signal $135_{M2}$ has a value corresponding to M2 of FIG. 2, and the control signal $135_{M1}$ has a value corresponding to M1 of FIG. 2. Based on the example of FIG. 2, where the value of the newly accessed element 150 is equal to the value of element 10 of the frame $122_3$, the value of the control signals $135_{M3}$ and $135_{M1}$ is 0, and the value of the control signal $135_{M2}$ is 1.

The OR gate 212 outputs the gate control signal $137_3$ having a value of 1 based on the control signal $135_{M2}$ having a value of 1 and the control signal $135_{M3}$ having a value of 0. Further, the OR gate 214 outputs the gate control signals $137_1$ and $137_2$ having a value of 1 based on the control signal $135_{M2}$ having a value of 1 and the control signals $135_{M1}$ and $135_{M3}$ having a value of 0.

In one example, a gate control signal 137 having a value of 1 indicates that the corresponding frame 122 is to be updated and a gate control signal 137 having a value of 0 indicates that the corresponding frame 122 is not to be updated. The frames $122_2$-$122_4$ are updated with the element previously stored in frames $122_1$-$122_3$, respectively, as illustrated by 320. Accordingly, the elements previously stored in the frames $122_1$-$122_3$ are shifted to the left by one frame. The frame $122_1$ is the most recently used frame, and is updated based on the recently used element 150.

The control circuitry $312_1$ of the frame $122_1$ receives the gate control signal $137_1$ having a value of 1, and the element within the frame $122_1$ is updated to be the recently used element 150, e.g., element 10, at the next rising (or negative) edge of a corresponding clock signal. The control circuitry $312_2$ of the frame $122_2$ receives the gate control signal $137_2$ having a value of 1, and the element within the frame $122_2$ is updated to be the element 00 previously stored in frame $122_1$ at the next rising (or negative) edge of a corresponding clock signal. The control circuitry $312_3$ of the frame $122_3$ receives the gate control signal $137_3$ having a value of 1, and the element within the frame $122_3$ is updated to be the element 10 previously stored in frame $122_2$ at the next rising (or negative) edge of a corresponding clock signal. The control circuitry $312_3$ of the frame $122_4$ receives the gate control signal $137_4$ having a value of 0. Accordingly, the frame $122_4$ is not updated, and the element in the frame $122_4$ remains as element 11.

While FIG. 2 and FIG. 3 illustrate an example where the MRU is at frame $122_1$, and the LRU element is at frame $122_4$, in other examples, the location of the MRU element and the LRU element may be reversed. In such an example, the above description may be adjusted accordingly (e.g., reversed) such that the elements in frames 122 are updated. In other examples, it is contemplated that the above description may be applied to any orientation of LRU elements to MRU elements within the frames 122.

Figure 4:
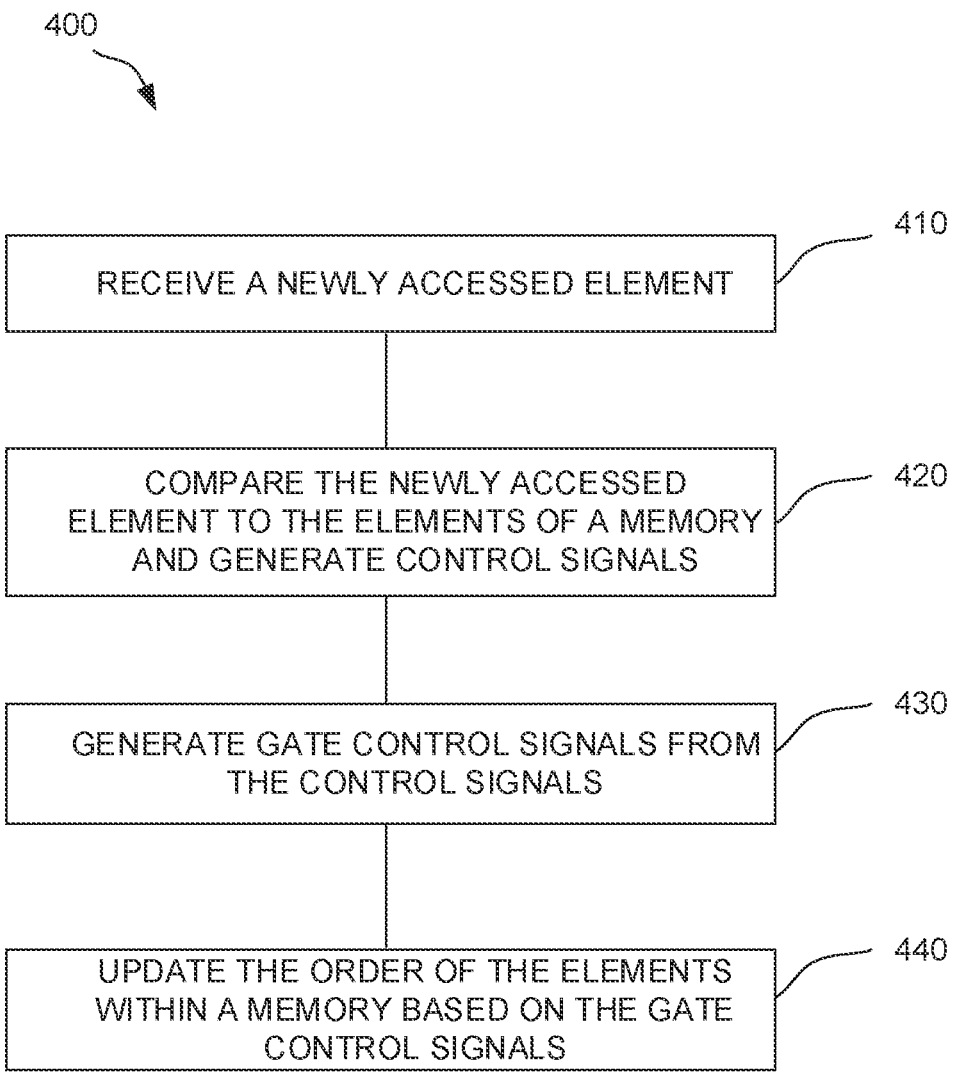
FIG. 4 depicts a flowchart of method for ordering elements in a memory in accordance with some embodiments of the present disclosure.

FIG. 4 illustrates a flowchart of a method 400 for reordering elements within a memory, according to one or more examples. The method 400 is performed by the memory management circuitry 130 of FIG. 1. At 410 of the method 400, a newly accessed element is received. For example, the memory management circuitry 130 receives the newly accessed element 150 as is illustrated in FIG. 2.

At 420 of the method 400, the newly accessed element is compared to the elements of a memory and control signals are generated. For example with reference to FIG. 2, the memory management circuitry 130 compares the newly accessed element 150 to the elements of the frames 122 of the memory 120 to determine whether or not the newly accessed element 150 matches the elements of the frames 122. In one example, the memory management circuitry 130 compares the newly accessed element 150 to the element of frame $122_2$ to determine value M1. Further, the memory management circuitry 130 compares the newly accessed element 150 to the element of frame $122_3$ to determine value M2. The memory management circuitry 130 further compares the newly accessed element 150 to the element of frame $122_4$ to determine value M3. As the element of the frame $122_1$ is the most recently used element, the memory management circuitry 130 does not compare the newly accessed element 150 with that of the frame $122_1$. A single comparator 133 may be used to complete the comparisons as described above. In another example, a respective comparator 133 is complete each of comparisons as described above.

In one example, the value of M1 is a 0 based on the value of the newly accessed element 150 not matching that of the frame $122_2$, and the value of M1 is 1 based on the value of the newly accessed element 150 matching that of the frame $122_2$. The value of M2 is a 0 based on the value of the newly accessed element 150 not matching that of the frame $122_3$, and the value of M2 is 1 based on the value of the newly accessed element 150 matching that of the frame $122_3$. The value of M3 is a 0 based on the value of the newly accessed element 150 not matching that of the frame $122_4$, and the value of M3 is 1 based on the value of the newly accessed element 150 matching that of the frame $122_4$. In one example, the values M1, M2, and M3 are control values used to generate control signals $135_{M1}$, $135_{M2}$, and $135_{M3}$.

At 430 of the method 400, gate control signals are generated from the control signals. For example with reference to FIG. 3, the control signals 135 are received by the gate control circuitry 136 and used to generate the gate control signals 137. In one example, the gate control circuitry 136 includes the OR gate 212 and the OR gate 214. The OR gate 212 generates the gate control signal $137_3$ based on the control signal $135_{M3}$ and $135_{M2}$. The OR gate 214 generates the gate control signals $137_1$ and $137_2$ based on the control signals $135_{M1}$, $135_{M2}$, and $135_{M3}$. The OR gate 212 outputs a gate control signal $137_3$ having a value of 1 based on either of the control signals $135_{M2}$ and $135_{M3}$ having a value of 1, and outputs a gate control signal $137_3$ having a value of 0 based on the control signals $135_{M2}$ and $135_{M3}$ having a value of 0. The OR gate 214 outputs the gate control signals $137_1$ and $137_2$ having a value of 1 based on at least one of the control signals $135_{M1}$, $135_{M2}$ and $135_{M3}$ having a value of 1, and outputs the gate control signals $137_1$ and $137_2$ having a value of 0 based on each of the control signals $135_{M1}$, $135_{M2}$ and $135_{M3}$ having a value of 0. The gate control signal $137_4$ has the same value as the control signal $135_{M3}$.

At 440 of the method 400, the order of the elements within the memory is updated based on the gate control signals. For example with reference to FIG. 3, the element within frame $122_1$ is updated with the newly accessed element 150 based on the gate control signal $137_1$ having a value of 1. The element within frame $122_1$ is updated with the newly accessed element 150 based on the gate control signal $137_1$ having a value of 1. Based on the gate control signal $137_1$ having a value of a value of 0, the element within the frame $122_1$ is not updated.

The elements within the frames $122_2$-$122_4$, e.g., all but the frame associated with the most recently used element, are updated based on respective ones of the control signals $137_2$-$137_4$ having a value of 1. The elements within the frames $122_2$-$122_4$, are not updated based on respective ones of the control signals $137_2$-$137_4$ having a value of 0. The frames $122_2$-$122_4$ are updated based on previous elements within the frames $122_1$-$122_3$. For example, the frame $122_2$ is updated based on the previous element within the frame $122_1$, the frame $122_3$ is updated based on the previous element within the frame $122_2$, and the frame $122_4$ is updated based on the previous element within the frame $122_3$. In one example, based on the gate control signal $137_2$ having a value of 1, the frame $122_2$ is updated based on the previous element within the frame $122_1$, and based on the gate control signal $137_2$ having a value of 0, the frame $122_2$ is not updated. Further, based on the gate control signal $137_3$ having a value of 1, the frame $122_3$ is updated based on the previous element within the frame $122_2$, and based on the gate control signal $137_3$ having a value of 0, the frame $122_3$ is not updated. Based on the gate control signal $137_4$ having a value of 1, the frame $122_4$ is updated based on the previous element within the frame $122_3$, and based on the gate control signal $137_4$ having a value of 0, the frame $122_4$ is not updated.

Figure 5:
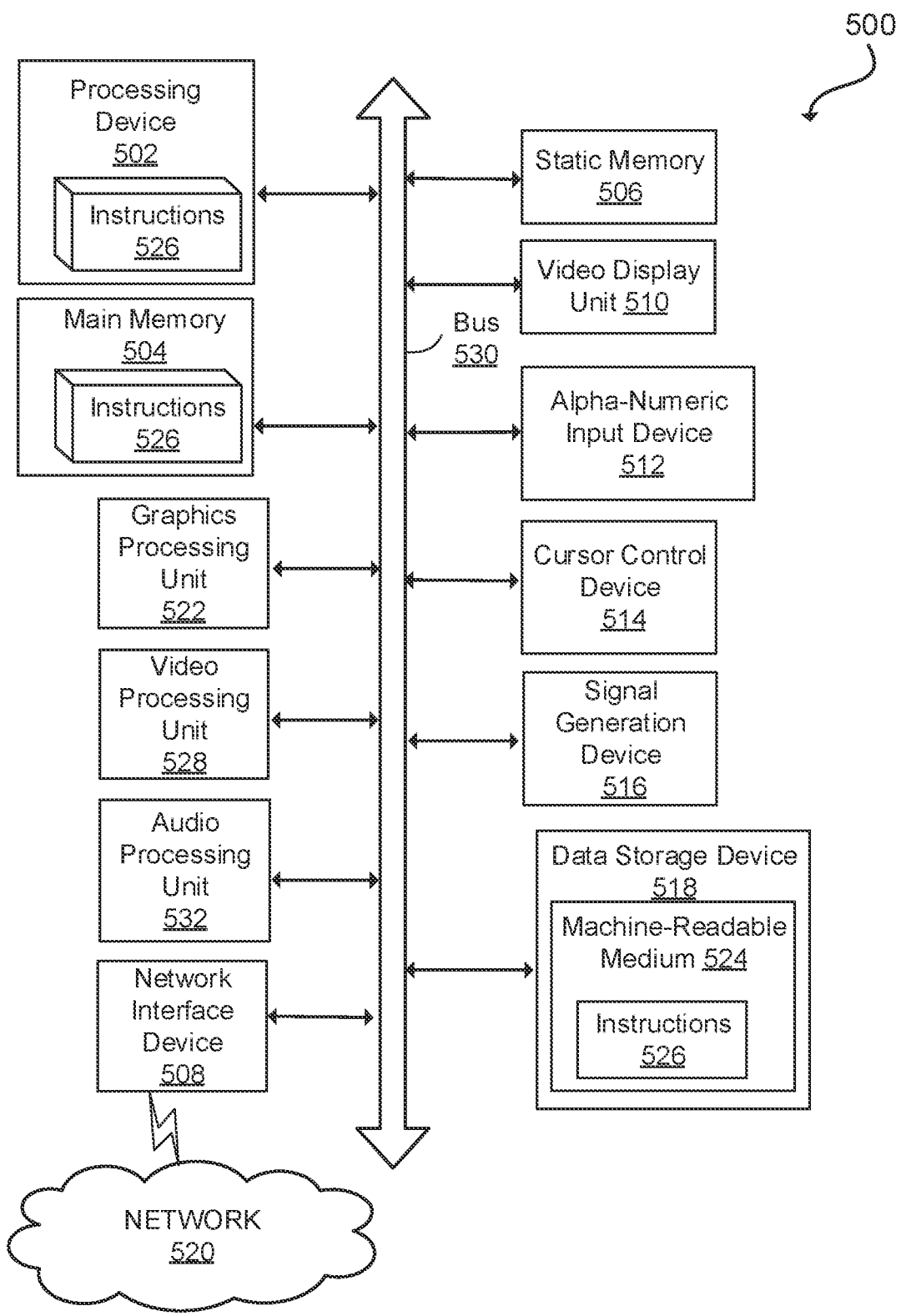
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving an accessed memory element, the accessed memory element requested by a processor from a memory;
   comparing, via memory management circuitry, the accessed memory element to stored elements within the memory to generate control signals;
   generating, via gate control circuitry, gate control signals, wherein a second gate control signal of the gate control signals is generated from a comparison of a first control signal of the control signals and a second control signal of the control signals; and
   updating an order of the stored elements within frames of the memory by updating a first frame of the frames based on a first gate control signal of the gate control signals and a second frame of the frames based on the second gate control signal, wherein the first gate control signal is a pass through version of the first control signal.

2. The method of claim 1 further comprising comparing the accessed memory element to a first element of the stored elements within the first frame to generate the first control signal, the accessed memory element to a second element of the stored elements within the second frame to generate the second control signal, and the accessed memory element to a third element of the stored elements within a third frame of the frames to generate a third control signal of the control signals.

3. The method of claim 2, wherein generating the gate control signals comprises generating a third gate control signal and a fourth gate control signal from the first control signal, the second control signal, and the third control signal.

4. The method of claim 3, wherein:
updating the first frame with the second element based on the first gate control signal having a first value, and not updating the first frame based on the first gate control signal having a second value;
updating the second frame with the third element based on the second gate control signal having the first value, and not updating the second frame based on the second gate control signal having the second value; and
updating the third frame with a fourth element based on the third gate control signal having the first value, and not updating the third frame based on the third gate control signal having the second value.

5. The method of claim 4, updating a fourth frame of the frames with the accessed memory element based on the fourth gate control signal having the first value, and not updating the fourth frame based on the fourth gate control signal having the second value.

6. The method of claim 5, wherein the first frame is associated with a least recently used element, and the fourth frame is associated with a most recently used element.

7. A processing system comprising:
a memory comprising frames comprising stored elements;
a processor configured to access the stored elements from the memory; and
memory management circuitry configured to:
receive an accessed memory element, the accessed memory element is requested by the processor from the memory;
compare the accessed memory element to the stored elements within the memory to generate control signals;
generate gate control signals, wherein a second gate control signal of the gate control signals is generated from a comparison of a first control signal of the control signals and a second control signal of the control signals; and
output the gate control signals to the memory to update an order of the stored elements within frames of the memory by updating a first frame of the frames based on a first gate control signal of the first gate control signal and a second frame of the frames based on the second gate control signal, wherein the first gate control signal is a pass through version of the first control signal.

8. The processing system of claim 7, wherein the memory management circuitry comprises one or more comparators configured to compare the accessed memory element to a first element of the stored elements within the first frame to generate the first control signal, the accessed memory element to a second element of the stored elements within the second frame to generate the second control signal, and the accessed memory element to a third element of the stored elements within a third frame of the frames to generate a third control signal of the control signals.

9. The processing system of claim 8, wherein generating the gate control signals comprises generating a third gate control signal and a fourth gate control signal from the first control signal, the second control signal, and the third control signal.

10. The processing system of claim 9, wherein the memory management circuitry comprises a first OR gate configured to generate the second gate control signal based on the first control signal and the second control signal, and a second OR gate configured to generate the third gate control signal and the fourth gate control signal based on the first control signal, the second control signal, and the third control signal.

11. The processing system of claim 9, wherein:
the first frame with the second element is updated based on the first gate control signal having a first value, and the first frame is not updated based on the first gate control signal having a second value;
the second frame is updated with the third element based on the second gate control signal having the first value, and the second frame is not updated based on the second gate control signal having the second value; and
the third frame is updated with a fourth element based on the third gate control signal having the first value, and the third frame is not updated based on the third gate control signal having the second value.

12. The processing system of claim 11, wherein a fourth frame of the frames is updated with the accessed memory element based on the fourth gate control signal having the first value, and the fourth frame is not updated based on the fourth gate control signal having the second value.

13. The processing system of claim 12, wherein the first frame is associated with a least recently used element, and the fourth frame is associated with a most recently used element.

14. A memory management circuitry comprising:
comparator circuitry configured to:
receive an accessed memory element, the accessed memory element is requested by a processor from a memory comprising stored elements associated with frames; and
compare the accessed memory element to the stored elements to generate control signals; and
gate control circuitry configured to:
generate gate control signals, wherein a second gate control signal of the gate control signals is generated from a comparison of a first control signal of the control signals and a second control signal of the control signals; and
output the gate control signals to the memory to update an order of the stored elements within frames of the memory by updating a first frame of the frames based on a first gate control signal of the gate control signals and a second frame of the frames based on the second gate control signal, wherein the first gate control signal is a pass through version of the first control signal.

15. The memory management circuitry of claim 14, wherein the comparator circuitry comprises one or more comparators configured to compare the accessed memory element to a first element of the stored elements within the first frame to generate the first control signal, the accessed memory element to a second element of the stored elements within the second frame to generate the second control signal, and the accessed memory element to a third element of the stored elements within a third frame of the frames to generate a third control signal of the control signals.

16. The memory management circuitry of claim 15, wherein generating the gate control signals comprises generating a third gate control signal and a fourth gate control signal from the first control signal, the second control signal, and the third control signal.

17. The memory management circuitry of claim 16, wherein the gate control circuitry comprises a first OR gate configured to generate the second gate control signal based on the first control signal and the second control signal, and a second OR gate configured to generate the third gate control signal and the fourth gate control signal based on the first control signal, the second control signal, and the third control signal.

18. The memory management circuitry of claim 16, wherein:
- the first frame is updated with the second element based on the first gate control signal having a first value, and the first frame is not updated based on the first gate control signal having a second value;
- the second frame is updated with the third element based on the second gate control signal having the first value, and the second frame is not updated based on the second gate control signal having the second value; and
- the third frame is updated with a fourth element based on the third gate control signal having the first value, and the third frame is not updated based on the third gate control signal having the second value.

19. The memory management circuitry of claim 18, wherein a fourth frame of the frames is updated with the accessed memory element based on the fourth gate control signal having the first value, and the fourth frame is not updated based on the fourth gate control signal having the second value.

20. The memory management circuitry of claim 19, wherein the first frame is associated with a least recently used element, and the fourth frame is associated with a most recently used element.

* * * * *